United States Patent

Wang et al.

[11] Patent Number: 5,812,705
[45] Date of Patent: Sep. 22, 1998

[54] DEVICE FOR AUTOMATICALLY ALIGNING A PRODUCTION COPY IMAGE WITH A REFERENCE COPY IMAGE IN A PRINTING PRESS CONTROL SYSTEM

[75] Inventors: Xinxin Wang, Woodridge; Robert Nemeth, Darien, both of Ill.

[73] Assignee: Goss Graphic Systems, Inc., Westmont, Ill.

[21] Appl. No.: 867,278

[22] Filed: Jun. 2, 1997

Related U.S. Application Data

[63] Continuation of Ser. No. 395,948, Feb. 28, 1995, abandoned.

[51] Int. Cl.⁶ .............................. G06K 9/32; B41F 15/04
[52] U.S. Cl. .......................... 382/294; 101/115; 355/88; 382/162
[58] Field of Search .................................... 382/162, 291, 382/302; 101/115; 355/88

[56] References Cited

U.S. PATENT DOCUMENTS

| | | | |
|---|---|---|---|
| 2,968,988 | 1/1961 | Fothergill | 88/14 |
| 3,612,753 | 10/1971 | Korman | 358/534 |
| 3,806,633 | 4/1974 | Coleman | 178/5.2 R |
| 3,958,509 | 5/1976 | Murray et al. | 101/426 |
| 4,249,217 | 2/1981 | Korte et al. | 358/294 |
| 4,308,553 | 12/1981 | Roetling | 358/75 |
| 4,472,736 | 9/1984 | Ushio et al. | 358/75 |
| 4,481,532 | 11/1984 | Clark et al. | 358/80 |
| 4,494,875 | 1/1985 | Schramm et al. | 356/402 |
| 4,505,589 | 3/1985 | Ott et al. | 356/402 |
| 4,539,647 | 9/1985 | Kaneko et al. | 364/526 |
| 4,583,186 | 4/1986 | Davis et al. | 364/526 |
| 4,649,502 | 3/1987 | Keller et al. | 364/519 |

(List continued on next page.)

| | | | |
|---|---|---|---|
| 5,604,586 | 2/1997 | Bahr et al. | 356/244 |

FOREIGN PATENT DOCUMENTS

| | | |
|---|---|---|
| 0 142 470 B1 | 10/1984 | European Pat. Off. . |
| 0 601 259 A1 | 12/1992 | European Pat. Off. . |
| 0 598 490 A1 | 5/1994 | European Pat. Off. ........ B41F 33/00 |
| 35 33 549 | 10/1986 | Germany . |
| 40 23 320 | 1/1992 | Germany . |
| 43 21 177 | 5/1995 | Germany ........................ B41F 33/10 |
| 60-115820 | 11/1985 | Japan . |
| 2-110566 | 4/1990 | Japan . |
| 649842 A5 | 6/1985 | Switzerland . |

OTHER PUBLICATIONS

Graphic Microsystems, Inc., Advertisement for Autosmart™ Software.

Graphic Microsystems, Inc., *Autosmart II Version 10.0 User's Manual*, pp. 1–2.

Heidelberg, *Technical Series . . . 2 Steop Guessing About Color.*

*Primary Examiner*—Joseph Mancuso
*Assistant Examiner*—Jayanti K. Patel
*Attorney, Agent, or Firm*—Marshall, O'Toole, Gerstein, Murray & Borun

[57] ABSTRACT

A device to align images for a printing press control system comprising, a device for capturing a reference image containing one or more image planes from a reference copy, a device for converting the reference image into a monochrome reference image, a device for capturing a production image containing one or more image planes from a production copy, a device for converting the production image into a monochrome production image, a device for defining at least one object model in the monochrome reference image, a device for identifying the position of at least one of the object models in the production image, a device for defining a transfer function which maps the position of the models in said monochrome production image to the position of the models in said monochrome reference image, and a device for applying the transfer function to each of the image planes of the production image, resulting in its alignment to the reference image.

21 Claims, 19 Drawing Sheets

U.S. PATENT DOCUMENTS

| | | | |
|---|---|---|---|
| 4,685,139 | 8/1987 | Masuda et al. | 382/112 |
| 4,713,684 | 12/1987 | Kawamura et al. | 358/78 |
| 4,752,822 | 6/1988 | Kawamura | 358/80 |
| 4,758,885 | 7/1988 | Sasaki et al. | 358/80 |
| 4,802,107 | 1/1989 | Yamamoto et al. | 364/525 |
| 4,830,501 | 5/1989 | Terashita | 356/402 |
| 4,837,711 | 6/1989 | Suzuki | 364/523 |
| 4,908,712 | 3/1990 | Uchiyama et al. | 358/298 |
| 4,910,593 | 3/1990 | Weil | 358/113 |
| 4,926,254 | 5/1990 | Nakatsuka et al. | 358/76 |
| 4,947,348 | 8/1990 | Van Arsdel | 364/523 |
| 4,949,284 | 8/1990 | Watanabe | 364/520 |
| 4,967,264 | 10/1990 | Parulski et al. | 358/44 |
| 4,967,379 | 10/1990 | Ott | 364/526 |
| 4,975,862 | 12/1990 | Keller et al. | 364/526 |
| 5,029,107 | 7/1991 | Lee | 395/145 |
| 5,045,937 | 9/1991 | Myrick | 358/109 |
| 5,053,866 | 10/1991 | Johnson | 358/75 |
| 5,068,810 | 11/1991 | Ott | 364/526 |
| 5,087,126 | 2/1992 | Pochieh | 356/402 |
| 5,089,977 | 2/1992 | Pflästerer et al. | 364/526 |
| 5,120,624 | 6/1992 | Takanashi et al. | 430/47 |
| 5,121,196 | 6/1992 | Hung | 358/75 |
| 5,122,977 | 6/1992 | Pfeiffer | 364/551.01 |
| 5,125,037 | 6/1992 | Lehtonen et al. | 382/8 |
| 5,157,506 | 10/1992 | Hannah | 358/298 |
| 5,163,012 | 11/1992 | Wuhrl et al. | 364/552 |
| 5,166,755 | 11/1992 | Gat | 356/419 |
| 5,166,789 | 11/1992 | Myrick | 358/109 |
| 5,175,772 | 12/1992 | Kahn et al. | 382/1 |
| 5,181,081 | 1/1993 | Suhan | 356/394 |
| 5,181,257 | 1/1993 | Steiner et al. | 382/17 |
| 5,182,721 | 1/1993 | Kipphan et al. | 364/526 |
| 5,206,707 | 4/1993 | Ott | 356/402 |
| 5,216,504 | 6/1993 | Webb et al. | 358/139 |
| 5,224,421 | 7/1993 | Doherty | 101/211 |
| 5,282,064 | 1/1994 | Yamada | 358/487 |
| 5,302,833 | 4/1994 | Hamar et al. | 250/559.3 |
| 5,357,448 | 10/1994 | Stanford | 364/526 |
| 5,359,677 | 10/1994 | Katsurada et al. | 382/58 |
| 5,363,318 | 11/1994 | McCauley | 364/571.01 |
| 5,384,621 | 1/1995 | Hatch et al. | 355/204 |
| 5,404,156 | 4/1995 | Yamada et al. | 358/534 |
| 5,404,158 | 4/1995 | Carlotta et al. | 347/32 |
| 5,412,577 | 5/1995 | Sainio et al. | 364/469 |
| 5,416,613 | 5/1995 | Rolleston et al. | 358/504 |
| 5,420,945 | 5/1995 | Concannon et al. | 250/559.3 |
| 5,424,553 | 6/1995 | Morton | 250/559.3 |
| 5,452,112 | 9/1995 | Wan et al. | 358/504 |
| 5,459,678 | 10/1995 | Feasey | 364/571.07 |
| 5,483,360 | 1/1996 | Rolleston et al. | 358/518 |
| 5,493,518 | 2/1996 | Keating | 364/578 |
| 5,508,810 | 4/1996 | Sato | 382/294 |
| 5,509,086 | 4/1996 | Edgar et al. | 382/167 |
| 5,509,115 | 4/1996 | Butterfield et al. | 395/147 |
| 5,521,722 | 5/1996 | Colvill et al. | 358/500 |
| 5,530,656 | 6/1996 | Six | 364/526 |

CAMERA: SINGLE CCD
WITH BUILT IN FILTERS $Max_x$ and $Max_y$ are the maximum misalignment between the production and reference copy images in the horizontal and vertical direction, respectively.

$$\begin{cases} x = u + A \\ y = v + B, \end{cases}$$

where A and B are constants

If only one model is found, production images can be translated to a new location without changing the size, shape or orientation.

If two models are found, production copy can be translated and scaled by the following transfer function:

$$\begin{cases} x = Au + B \\ y = Cv + D, \end{cases}$$

where A, B, C, and D are constants.

If three models are found, production copy can be translated, scaled, and rotated to align with the reference copy according to the following transfer function:

$$\begin{cases} x = Au + Bv + C \\ y = Du + Ev + F, \end{cases}$$

where A, B, C, D, E, and F are constants.

If all four models are found, production copy can be translated, scaled, rotated, and warped by the following bilinear transfer function:

$$\begin{cases} x = Au + Buv + Cv + D \\ y = Eu + Fuv + Gv + H, \end{cases}$$

where A, B, C, D, E, F, G, and H are constants.

DEVICE FOR AUTOMATICALLY ALIGNING A PRODUCTION COPY IMAGE WITH A REFERENCE COPY IMAGE IN A PRINTING PRESS CONTROL SYSTEM

This is a File Wrapper Continuation of U.S. application Ser. No. 08/395,948, filed Feb. 28, 1995, now abandoned.

BACKGROUND OF THE INVENTION

The present invention relates to control systems for a printing press.

In the past, four process inks (cyan, magenta, yellow and black) have been used on a printing press to produce copies with a gamut of colors. To improve trapping and reduce ink cost, various undercolor removal techniques (UCR) and grey component replacement (GCR) techniques have been used in the color separation processing. The UCR and GCR techniques remove a certain amount of the cyan, magenta and yellow ink from some printing areas and replace them with a certain amount of the black ink. Thus, the black ink has been used to generate not only the text but also the color image, thus reducing the total volume of ink used to print. Different color separation equipment manufacturers offer different UCR and GCR techniques to determine when this black ink substitution will take place and what amount of inks will be substituted.

In the past, the press room color reproduction quality control process has been divided into two categories: "control by target" and "control by image."

In the "control by target" method, a set of color control targets is printed in a margin. Instruments, such as densitometers, are used to monitor the color attributes, such as the optical density, of these targets. The printing press is then adjusted based on the measured deviation of these control targets from a predefined attribute value. The application of this method for quality control creates waste and consumes resources in that an additional process is required to cut off this target from the final product. It also requires a tight material control for paper, ink, and other printing parameters.

In the "control by image" method, the print image on a production copy is compared with the printed image on a reference copy, called a proof. The press is then adjusted based on the difference between the production image and the reference image. This system is more versatile because it does not require an additional target to be printed. The "control by image" method is also more accurate than the "control by target" method because in some situations although the measured attributes of control targets on the production and reference images are the same, the two images will look different. Conventionally, both the image comparing task and the press adjusting task are performed by a press operator. To improve the productivity and the color consistency, several automatic printing quality inspection systems have been reported recently. These systems use opto-electronic sensor devices, such as a spectrophotometer, or CCD color cameras, to measure the color reproduction quality. Currently, the bandwidth of these sensor devices is limited to the visible region of 400 nm through 700 nm in wavelength of the electromagnetic spectrum. However, within the visible region, it is not possible for these devices to reliably distinguish the black ink from the process black made by the combination of cyan, magenta, and yellow inks, or to determine whether the black ink or all cyan, magenta, and yellow inks should be adjusted. Although these devices, such as spectrophotometers, might be able to measure the printed color accurately, it is difficult to use the measured color information to achieve the automatic control for a four-color press without a target due to the involvement of the UCR and GCR techniques. A control method without targets could require selecting the points in the image to be measured or a large number of measurements would have to be acquired. A camera system can acquire a large number of measurements simultaneously, giving it an advantage when targets are not printed.

It has been found, during the process of gathering data from the production and reference copies in preparation for the comparison task, that a production copy might be placed under the camera field of view in a position other than that occupied by the reference copy when its image was acquired. Since electronic comparisons are made between the images in such small areas, it is nearly impossible to humanly align the production image in the same location as that previously occupied by the reference. The process used to manufacture the printed material also compounds the problem of positioning since the paper may be cut in a different place from copy to copy. The image may be printed in a different location on the moving press web as rolls of paper replenish the process. Each of these conditions makes it more difficult to align copies manually, even with the aid of an alignment guide such as a straight edge fixed to a table. Exact alignment is necessary since comparisons between the two images occur on a pixel by pixel basis which may represent copy displacement on the order of hundredths or thousands of an inch. It is clear that an automatic alignment device is necessary so that the features and color in one image might be compared with the exact same features and color in a second image within reasonable limits.

SUMMARY OF THE INVENTION

A principal feature of the present invention is the provision of a device to align images for a printing press control system.

The device comprises, means for capturing a reference image containing one or more image planes from a reference copy, means for converting the reference image into a monochrome reference image, means for capturing a production image containing one or more image planes from a production copy, means for converting the production image into a monochrome production image, means for defining at least one object model in the monochrome reference image, means for identifying the position of at least one of the object models in the production image, and means for defining a transfer function which maps the position of the models in the monochrome production image to the position of the models in the monochrome reference image.

A feature of the invention is the provision of means for applying the transfer function to each of the image planes of the production image, resulting in its alignment to the reference image.

Another feature of the invention is the provision of means for defining a transfer function which maps the model position on the monochrome production image to the model position of the monochrome reference image.

Another feature of the invention is that the resultant images of the production copy will be aligned with those captured from the reference copy.

A further feature of the invention is that the system automatically aligns the production image with the reference image.

A further feature of the invention is that up to four models can be defined in the monochrome reference image.

Therefore, the production image can still be aligned with the reference image even if one, two, or three models cannot be located in the monochrome production image when the printed copy is severely degraded.

Further features will become more fully apparent in the following description of the embodiments of the invention, and from the appended claims.

DESCRIPTION OF THE PREFERRED EMBODIMENTS

Figure 1:
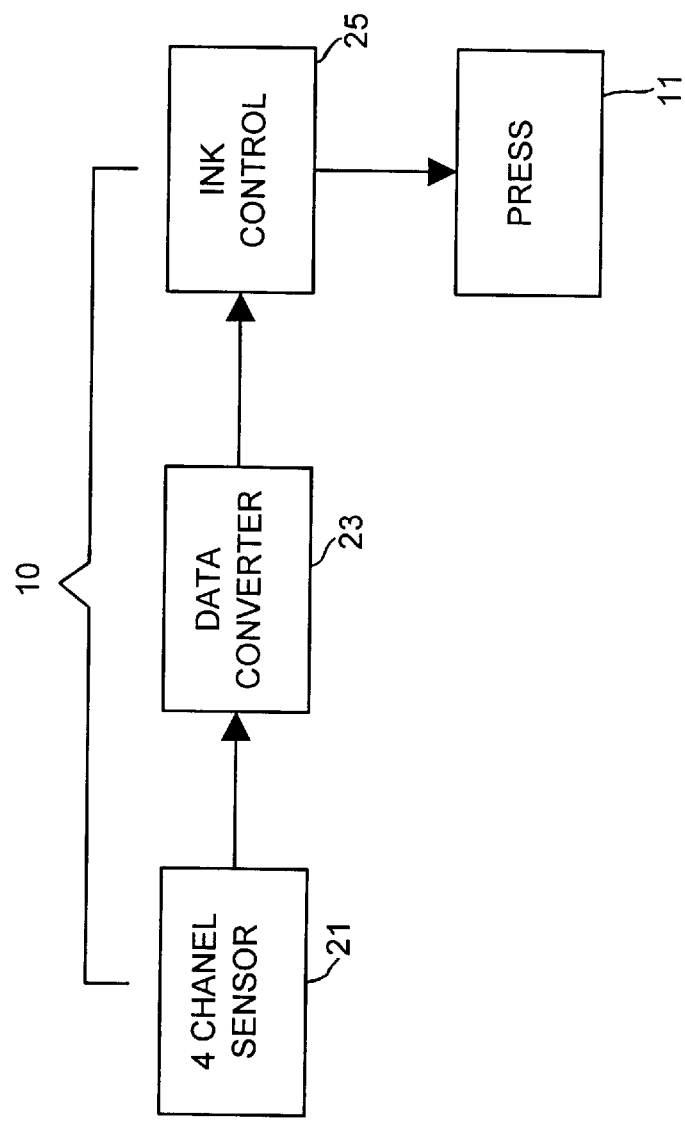
FIG. 1 is a block diagram of a control system for a printing press of the present invention.

Referring now to FIG. 1, there is shown a control system generally designated 10 for a printing press 11 of the present invention.

Figure 8:
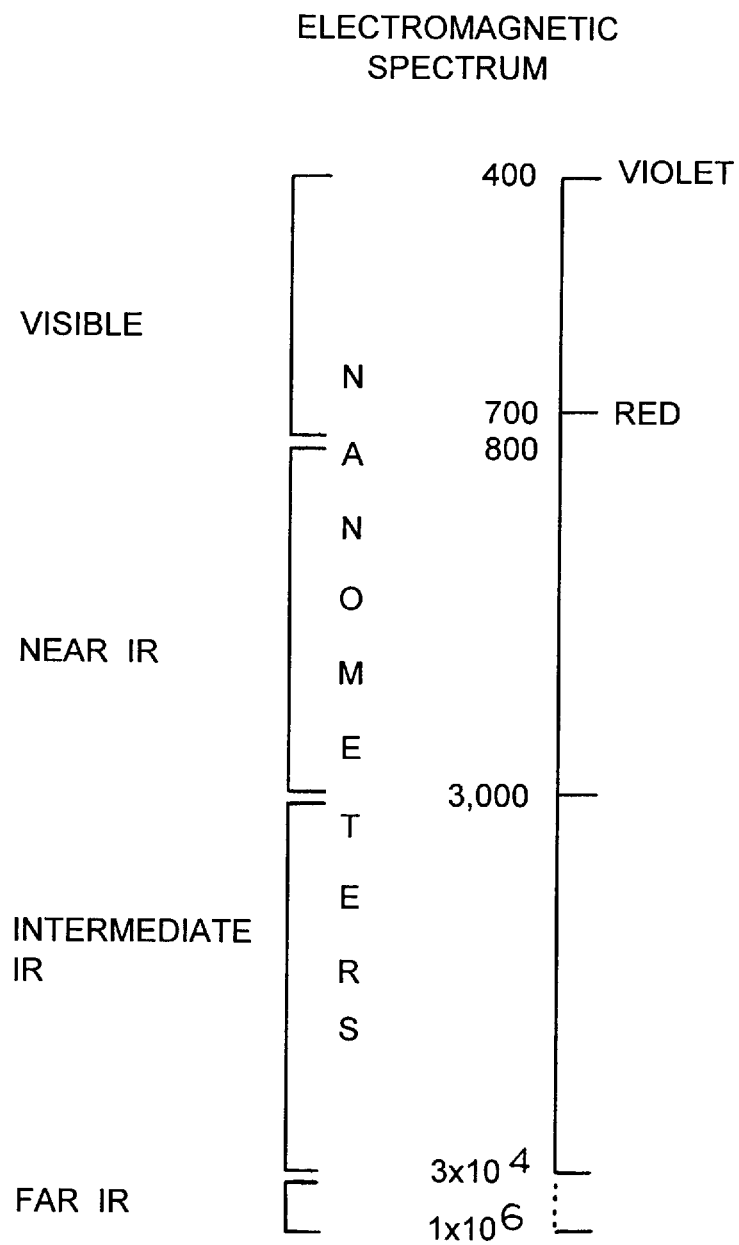
FIG. 8 is a diagrammatic view of a spectrum of electromagnetic waves including the visible spectrum and the infrared spectrum.

The control system 10 has a 4 channel sensor 21, a data converter 23 for processing information from the sensor 21, and a device 25 for controlling ink for the press 11. As will be seen below, the 4 channel sensor 21 detects the energy reflected from a paper surface, such as the paper web for the press 11, in both the visible region and the infrared region of the electromagnetic spectrum. As shown in FIG. 8, electromagnetic waves in the infrared region have a longer wave length than the visible spectrum, with the wave lengths of the electromagnetic waves in the region of visible light being approximately 400 to 700 nanometers (nm), and the wave lengths of the electromagnetic waves in the infrared region, including near infrared, being equal to or greater than 800 nm.

Figure 2:
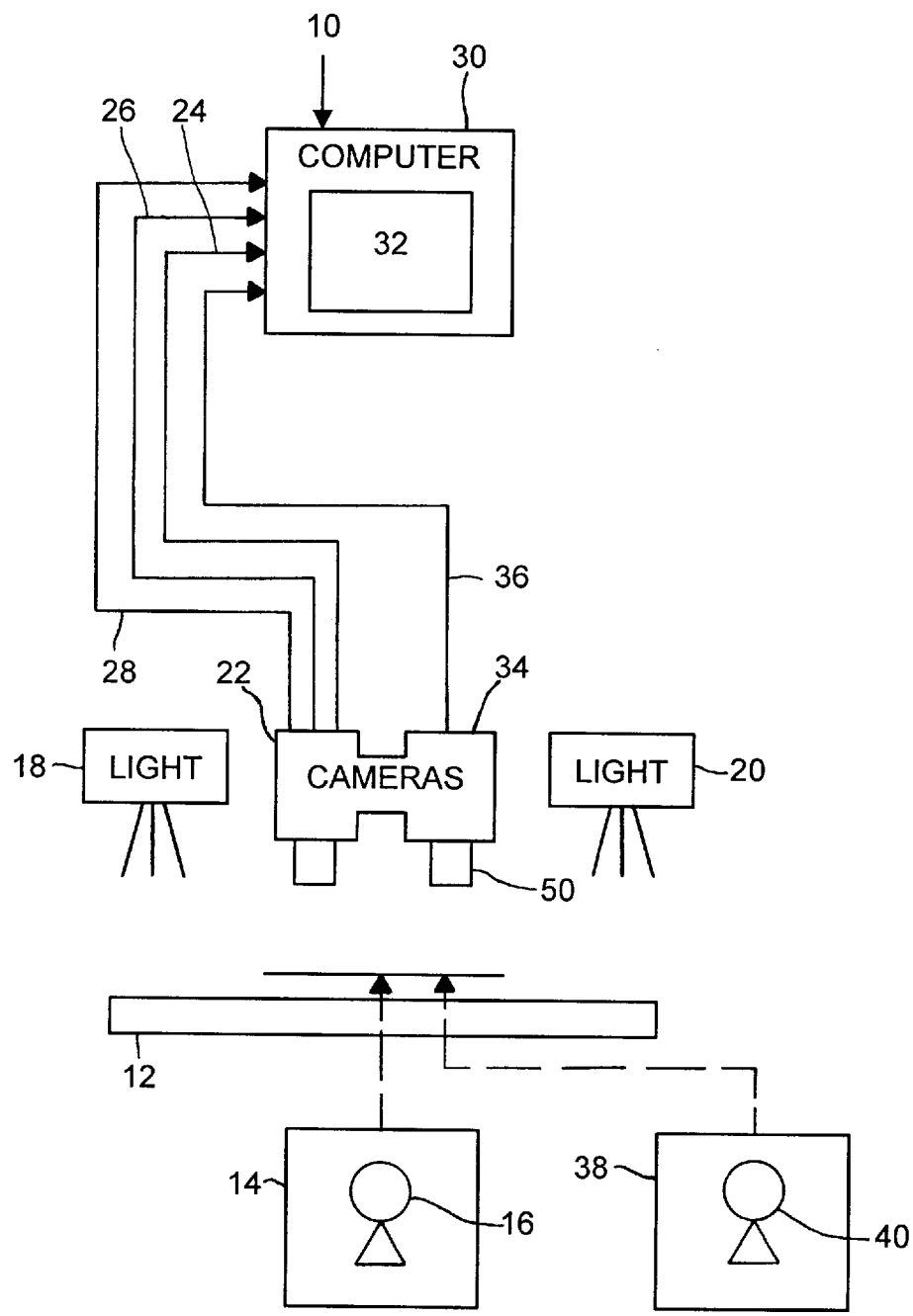
FIG. 2 is a diagrammatic view of the system of FIG. 1.

As show in FIG. 2, the control system 10 has a support 12 for placement of a sheet of paper 14 with image or indicia 16 on the sheet 14 in a configuration beneath a pair of opposed lights 18 and 20 for illuminating the sheet 14, The system 10 has a first color video camera or sensor 22 having three channels for detecting attributes of the inks from the sheet 14 in the visible region of the electromagnetic spectrum such as red, green and blue, or cyan, magenta, and yellow, and for sending the sensed information over separate lines or leads 24, 26, and 28 to a suitable digital computer 30 or Central Processing unit having a randomly addressable memory (RAM) and a read only memory (ROM), with the computer or CPU 30 having a suitable display 32. Thus, the three distinct color attributes of the inks are sensed by the camera 22 from the sheet 14, and are received in the memory of the computer 30 for storage and processing in the computer 30.

The system 10 also has a black/white second video camera or sensor 34 having a filter 50 such that it senses the attributes of the inks in the infrared region of the electromagnetic spectrum, having a wave length greater than the wave length of the electromagnetic waves in the visible region of light. The camera or sensor 34 thus senses infrared information from the sheet 14, and transmits the sensed information over a lead 36 to the computer 30, such that the information concerning the infrared rays is stored in and processed by the computer 30.

Figure 7:
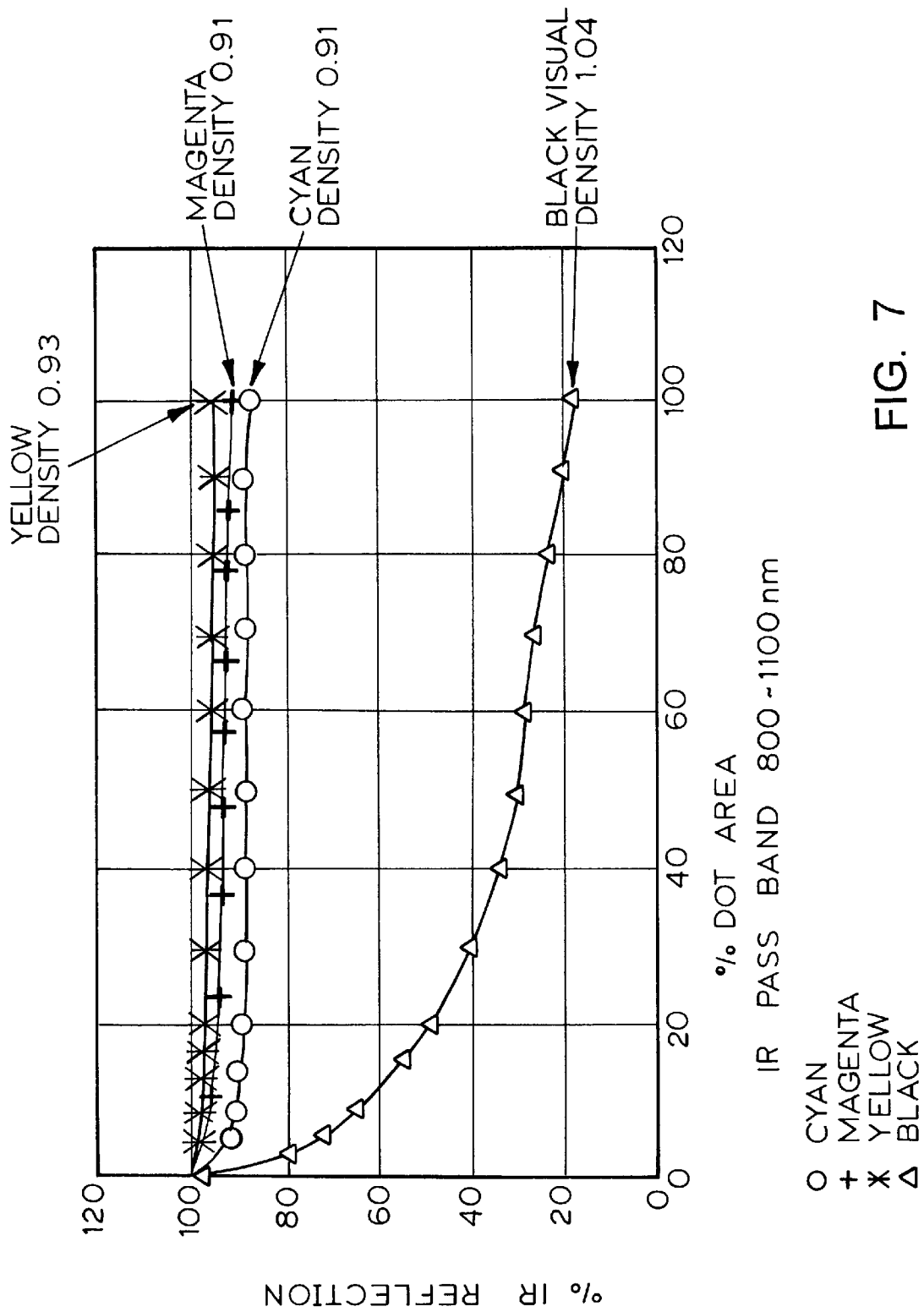
FIG. 7 is a chart plotting the normalized percentage of IR Reflection against the percentage Dot Area in a printed sheet.

The normalized percentage of infrared (IR) reflection vs. the percentage of dot area is show in the chart of FIG. 7. It will be seen that the infrared reflectance of cyan, magenta, and yellow inks show no significant change as a function of percentage of dot area. However, the normalized infrared reflectance of the black ink displays a significant change as a function of percentage of dot area, and changes from a normalized value of 100% IR reflection for 0% dot area to approximately 18% IR reflection corresponding to 100% dot area. Hence, the black ink may be easily sensed and distinguished from other color inks in the infrared region of the electromagnetic waves.

As shown in FIG. 2, the sheet 14 may contain printed image or indicia 16 which is obtained from a current press run of the press 11, termed a production or current copy. In addition, a sheet 38 containing printed image or indicia 40, termed a reference copy, from a previous reference press run may be placed on the support 12 beneath the cameras 22 and 34 in order to sense the energy reflected from the sheet 38, and send the sensed information to the memory of the computer 30 for storage and processing in the computer 30, as will be described below.

Thus, the cameras or sensors 22 and 34 may be used to sense both the current copy or sheet 14 and the reference copy or sheet 38. The information supplied by the cameras 22 and 34 is formed into digital information by a suitable analog to digital converter in a frame grabber board on the computer 30. Thus, the computer 30 operates on the digital information which is stored in its memory corresponding to the information sensed from the sheets 14 and 34 by the cameras or sensors 22 and 34.

Figure 3:
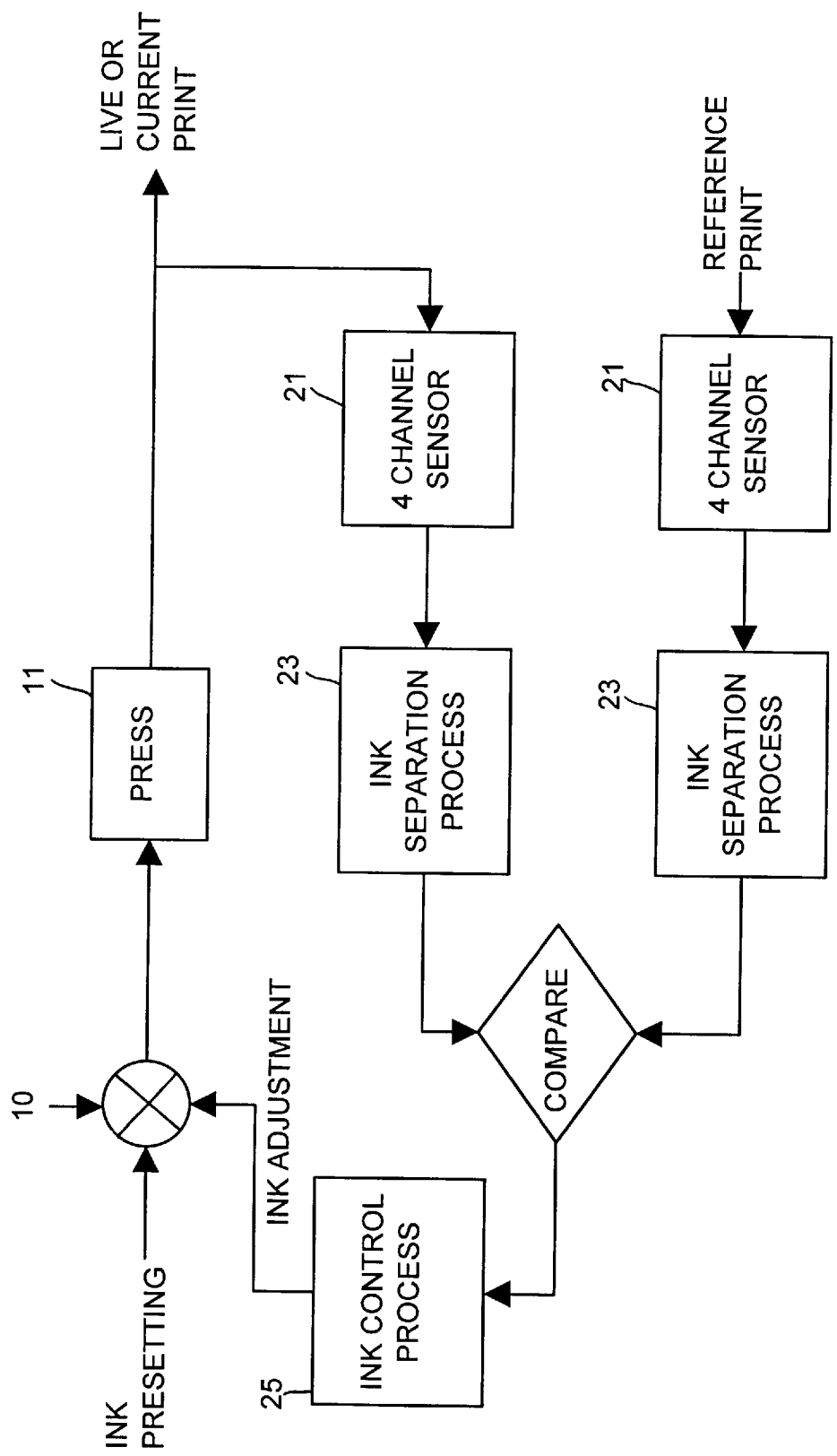
FIG. 3 is a block diagram of the control system of FIG. 1.

Referring now to FIG. 3, there is shown a block diagram of the control system 10 for the printing press 11 of the present invention. As shown, the four inks (cyan, magenta, yellow, and black) of the four-color printing press 11 are first preset, after which a print is made by the press 11 with a current ink setting, thus producing a production or current printed copy, as shown. The color and black/white video cameras or sensors 22 and 34 of FIG. 2 serve as a four channel sensor 21 to capture an image of the current printed copy, and then place this information into the memory of the computer 30 after it has been formed into digital information.

Next, an "Ink Separation Process" 23 is used to convert the red, green, blue and IR images captured by the four channel sensor 21 into four separated cyan, magenta, yellow and black ink images, which represent the amount of corresponding ink presented on the live copy. The "Ink Separation Precess" 23 may utilize mathematic formulas, data look up tables or other suitable means to perform the data conversion task.

The similar processes are also applied to the reference copy. First, the four channel sensor 21 is used to capture the red, green, blue and IR images from the reference copy. Then, the "Ink Separation Process" 23 is utilized to obtain the cyan, magenta, yellow and black ink images, which represent the amount of corresponding ink presented on the reference copy.

As shown, the ink images of the production copy are compared with the ink images of the reference copy by the computer 30 to detect the variation of ink distribution for each of the cyan, magenta, yellow and black inks.

The determined differences in ink distribution are then processed by the computer 30 in order to obtain an indication for controlling the keys or other devices of the press 11 in an ink control process, and thus provide an indication of an ink adjustment to the press to obtain further copies which will have a closer match to the reference copy. The indication of ink changes may be automatically supplied to the press 11, or the operator may utilize the indications of ink color attributes to set the press 11, such as adjustments to ink input rate by using the keys.

In the past, four process inks (cyan, magenta, yellow, and black) have been used on a printing press to produce copies with a gamut of colors. In these systems, the black ink has been used to generate not only the text but also the color image. In a control by image system, the print image of a production copy is compared with the printed image on a reference copy, termed a proof, and the press is adjusted based on the difference between the production image and the reference image. However, within the visible region, it is not possible to reliably distinguish the black ink from the process black made by the combination of cyan, magenta, and yellow inks, or whether the black ink or all cyan, magenta, and yellow inks should be adjusted.

The four channel sensor 21 is utilized to sense not only attributes in three channels of the visible region, the fourth channel of the sensor 21 senses an attribute in the infrared region in order to determine the correct amount of inks, including black ink, to correctly reproduce the proof. The printing press control system uses the four channel detector or sensor 21 to detect the energy reflected from a paper surface, such as the sheets 14 and 38, or the paper web of the press 11, with three channels being in the visible region and one channel being in the infrared region of the electromagnetic spectrum. The control system 10 has a device 23 for converting the output of the sensing device 21 to a set of variables which represent the amount of ink presented on the paper for any of the cyan, magenta, yellow, and black inks, and a device 25 responsive to the converting device 23 for adjusting the four-color printing press 11 to maintain the color consistency.

In a preferred form, the bandwidth of the infrared channel may be between 800 nm and 1100 nm, which is a portion of the near infrared region, and which is compatible with a regular silicon detector, although the working wavelength of the infrared channel may be longer than 1100 nm. At least three distinct channels are utilized in the visible region which may correspond to red, green, and blue (RGB), or cyan, magenta, and yellow (CMY), or other colors. The bandwidth of each channel in the visible region may be less than 70 nm, more than 100 nm, or any value inbetween, with channels having a multiple peak in its passing band, such as magenta, being also included.

The sensor device 21 may be constructed from either a single element detector, a one-dimensional (linear) detector, a two-dimensional (area) detector, or other suitable detector structure, as will be seen below. The sensor device may be constructed by adding an additional infrared channel to existing devices, adding an infrared channel to a RGB color camera or a densitometer, or by extending the working band into the infrared region, e.g., adding infrared capability to a spectrophotometer. The light source 18 and 20 used provides sufficient radiated energy in both the visible region and the infrared region, depending upon the sensor working band and sensitivity.

Figure 9:
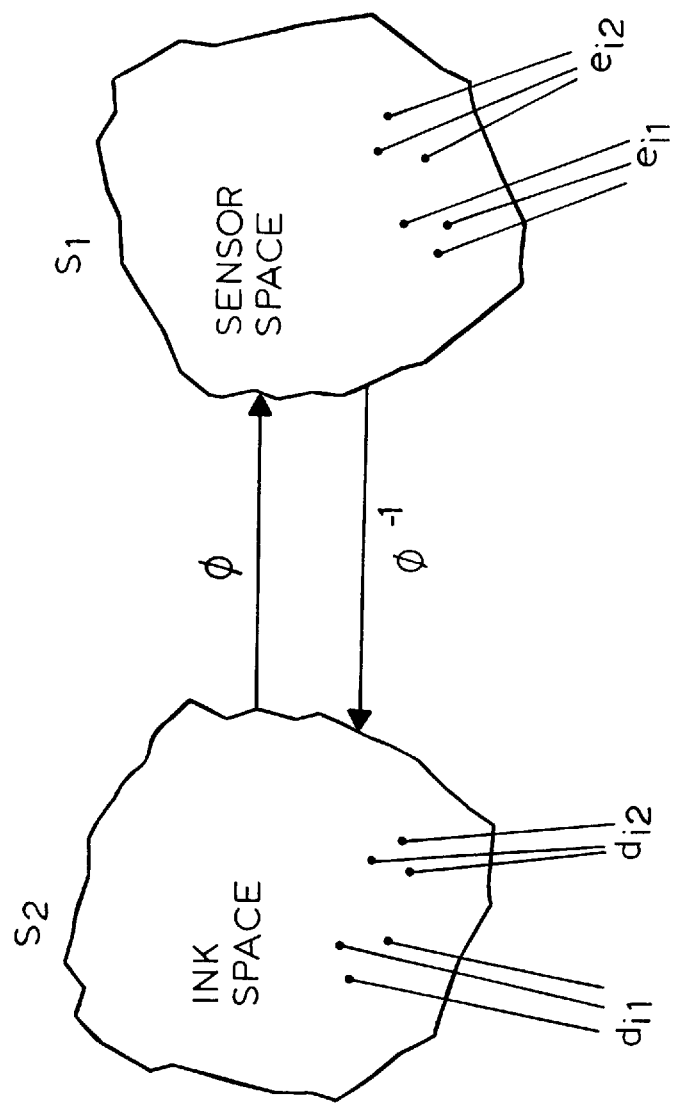
FIG. 9 is a diagrammatic view of set of elements for a sensor space and ink space.

All possible values which are output from the sensor device 21 may be used to form a vector space. For example, all possible values output from the sensor device 21 with red, green, blue and infrared channels form a four dimensional vector space R-G-B-IR, with the vector space being termed a sensor space $S_1$, with each output from the sensor device 21 being termed a vector in the sensor space $S_1$, with the minimum number of dimensions required by the sensor structure being 4. Thus, as shown in FIG. 9, a set $S_1$ of elements $e_{11}$ and $e_{12}$ being given, with the elements $e_{11}$ of the set $S_1$ being the vectors $v_{11}$ corresponding to the output from the sensor device 21 of sensing a production or current printed copy, and with the elements $e_{12}$ of the set $S_1$ being the vectors $v_{12}$ corresponding to the output from the sensor device 21 sensing a reference printed copy. In accordance with the present invention, the printed image on a production or current copy may be compared with the printed image on a reference copy in the sensor space, and if the difference between the live copy $L.C._s$ and the reference copy $R.C._s$ is within a predefined tolerance level delta, at least for all the channels in the visible region of the sensor space, such that, $[L.C._s - R.C._s] \leq$ delta, the production or current copy is said to be acceptable by definition.

A set of variables may be defined to represent the amount of ink presented in a given area. For example, a set of variables C, M, Y, and K can be defined to represent or be a function of the amount of cyan, magenta, yellow, and black ink in a given area. This set of variables may correspond to the ink volume, average ink film thickness, dot size, or other quantities related to the amount of ink in a given area on the paper surface. The vector space formed by this set of variables is termed an ink space $S_2$, with the ink space $S_2$ having a dimension of 4 for a four color printing press 11. Thus, with reference to FIG. 9, a set $S_2$ of elements $d_{11}$ and $d_{12}$ are given, with the elements $d_{11}$ of the set $S_2$ being the vectors $v_{j1}$ corresponding to the variables associated with the production or current copy in the ink space $S_2$, and with the elements $d_{12}$ of the set $S_2$ being the vectors $v_{j2}$ corresponding to the variables associated with the reference copy in the ink space $s_2$.

Figure 10:
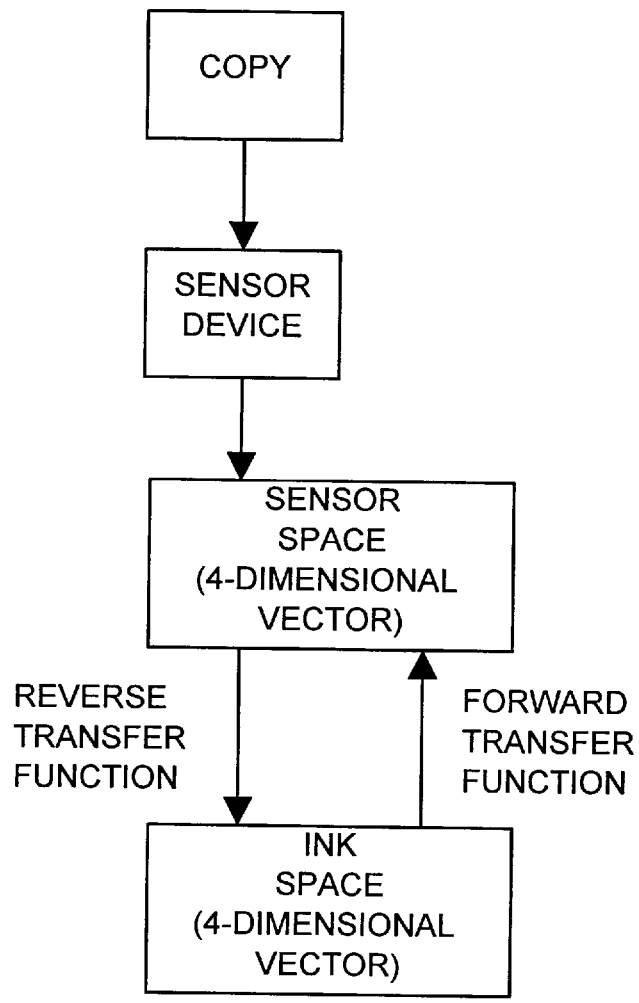
FIG. 10 is a block diagram of the sensor space and ink space in conjunction with the control system of the present invention.

With reference to FIG. 9, there exists at least one transfer function or transformation phi which can map the elements $d_{11}$ and $d_{12}$ of the set $S_2$ or the four dimensional ink space, into the elements $e_{11}$ and $e_{12}$ of the set $s_1$ or the four dimensional sensor space, with the transformation phi being termed a forward transfer function, as shown in FIGS. 9 and 10. It is noted that the subsets in each set $S_1$ and $S_2$ may overlap or may be the same.

The forward transfer function may be used in a soft proof system which can generate a proof image which can be stored in the system as a reference or can be displayed on a CRT screen.

With further reference to FIG. 9, there exists at least one transfer function or reverse transformation $phi^{-1}$ which can map the elements $e_{11}$ and $e_{12}$ of the set $S_1$ of the four dimensional sensor space into the elements of $d_{11}$ and $d_{12}$ of the set $S_2$ of the four dimensional ink space, with the transfer function being termed a reverse transfer function. Thus, both the production image and the reference image in the sensor space or set $S_1$ can be mapped into the ink space or set $S_2$ by applying the reverse transfer function $phi^{-1}$ point by point as shown in FIGS. 9 and 10.

Figure 11:
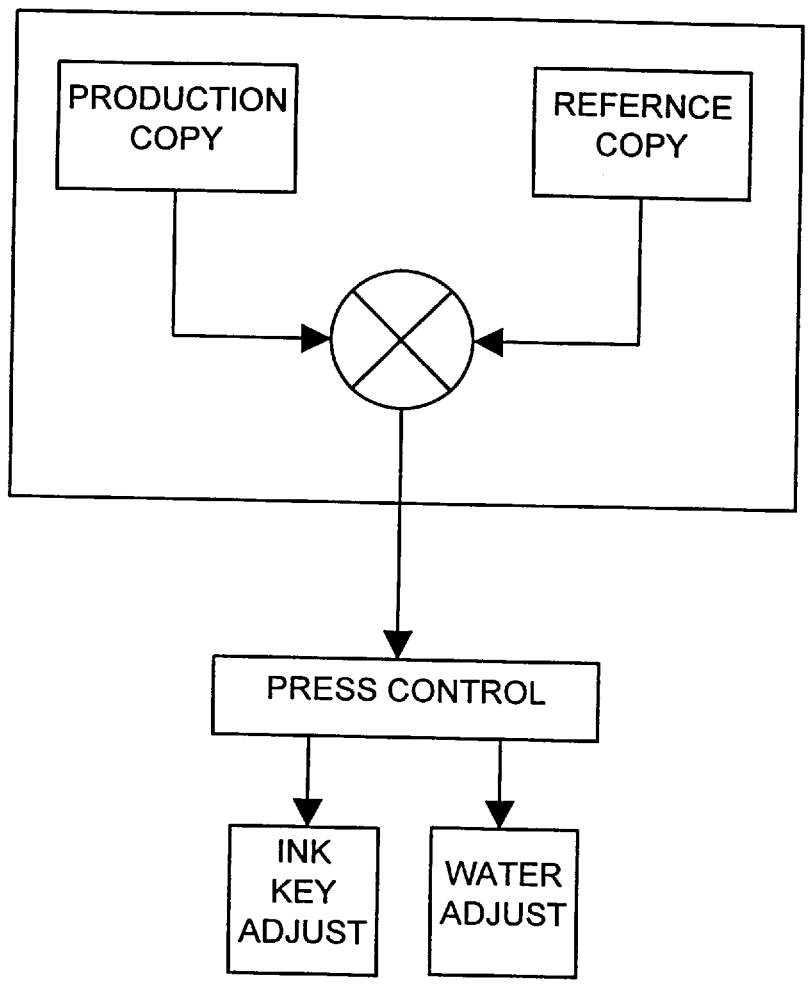
FIG. 11 is a block diagram of the control system for adjusting the printing press.

The difference between the production image and the reference image in the ink space $S_2$ thus represents the difference of the ink distribution for each of the cyan, magenta, yellow, and black inks, as shown in FIG. 11. The difference between the live and reference images in the ink space $S_2$ indicates which printing unit should be adjusted, which direction, up or down, it should be adjusted, and the amount of ink which should be adjusted. A suitable press control formula may be developed to adjust press parameters, such as ink input rate in lithographic or letterpresses, ink consistency in flexographic or gravure presses, water input rate in lithographic presses, or temperature in any of the above, based on the differences between the production and the reference image in the ink space $S_2$.

In accordance with the present invention, the press adjustments can be achieved by the automatic control system 10, by press operator alone, or by the interaction between the automatic control system 10 and the press operator. Also, the sensor device 21 may be used to monitor the printing web of the press 11 directly, i.e., on press sensing, or to monitor the prints collected from the folder of the press, i.e., off press sensing. If the digital images from the color separation processing, or the film/plate images are available, the image of the reference copy in the sensor device 21 can be generated electronically by the forward transfer function phi. The electronically generated reference may be used to set up the press 11 in order to reduce the make ready time.

The color reproduction quality can be maintained through the entire press run, through different press runs on different presses, or at different times. Thus, a closed loop automatic color reproduction control system may be formed without an additional color control target. The variation of ink, paper, and other press parameters can be compensated such that the printed copies have the highest possible overall results in matching the reference copy.

Figure 4:
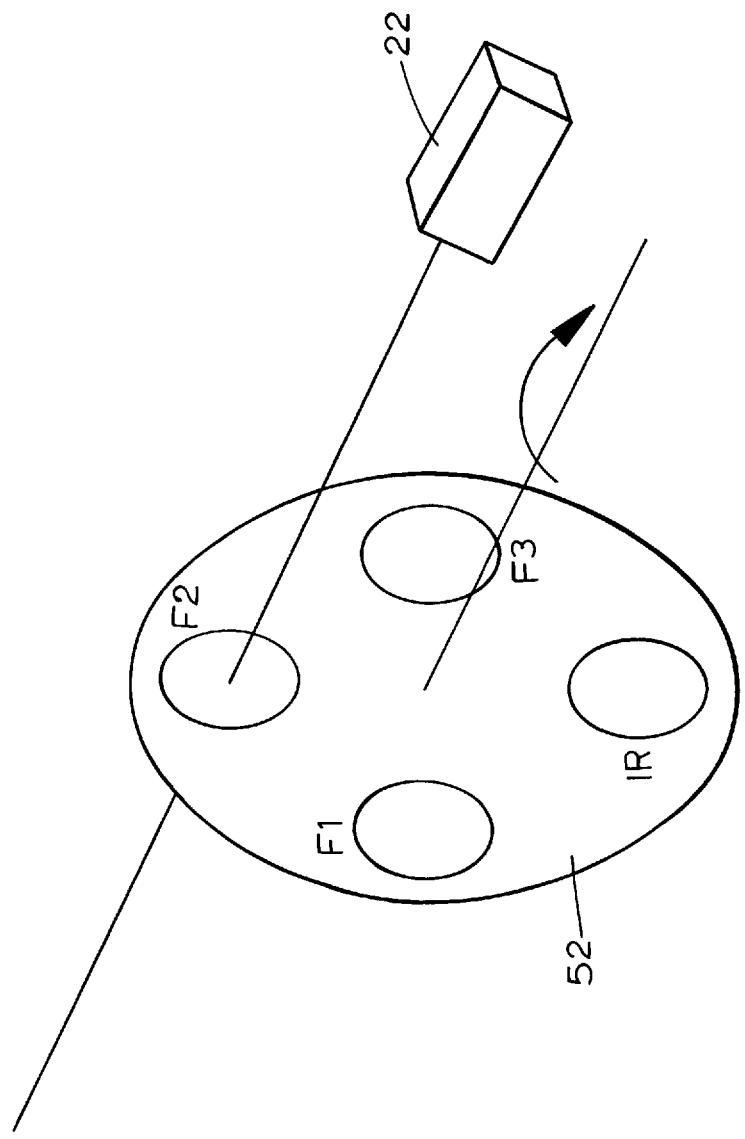
FIG. 4 is a diagrammatic view of a camera or sensor for the control system of the present invention.

As shown in FIG. 4, the camera or sensor 22 may be associated with a rotating filter member 52 having filters which only transmit the desired colors $F_1$, $F_2$, and $F_3$, such as red, green, and blue during rotation, such that the camera or sensor 22 senses and records the colors $F_1$, $F_2$, and $F_3$, sequentially or separately from the printed material which may be taken either from the current press run or from the reference press run. In addition, the filter member 52 may have an infrared (IR) filter $F_4$ in order to sense and record the energy reflected form the printed material in the infrared region. The information received by the camera or sensor 22 from the filters may be recorded in the computer or CPU for use in forming the desired data to control the inks, as previously discussed.

Figure 5:
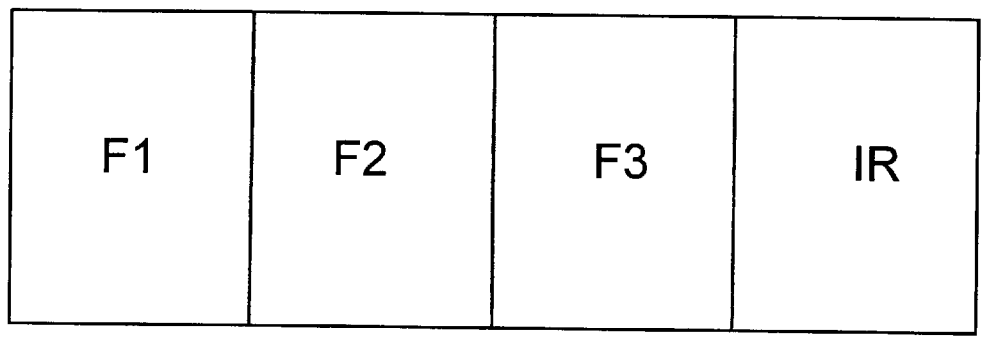
FIG. 5 is a diagrammatic view of another embodiment of the camera or sensor for the control system for the present invention.

In another form as shown in FIG. 5, the camera or sensor 22 may comprise a charge coupled device (CCD) with built in filters which converts light energy reflected from the printed material into electric energy in a video camera, i.e. $F_1$, $F_2$, $F_3$, and $F_4$, (IR), such as the distinct colors red, green, and blue in the visible region, and the near infrared energy in the infrared region, in order to supply the information to the computer 30 for storage and processing, as previously discussed.

Figure 6:
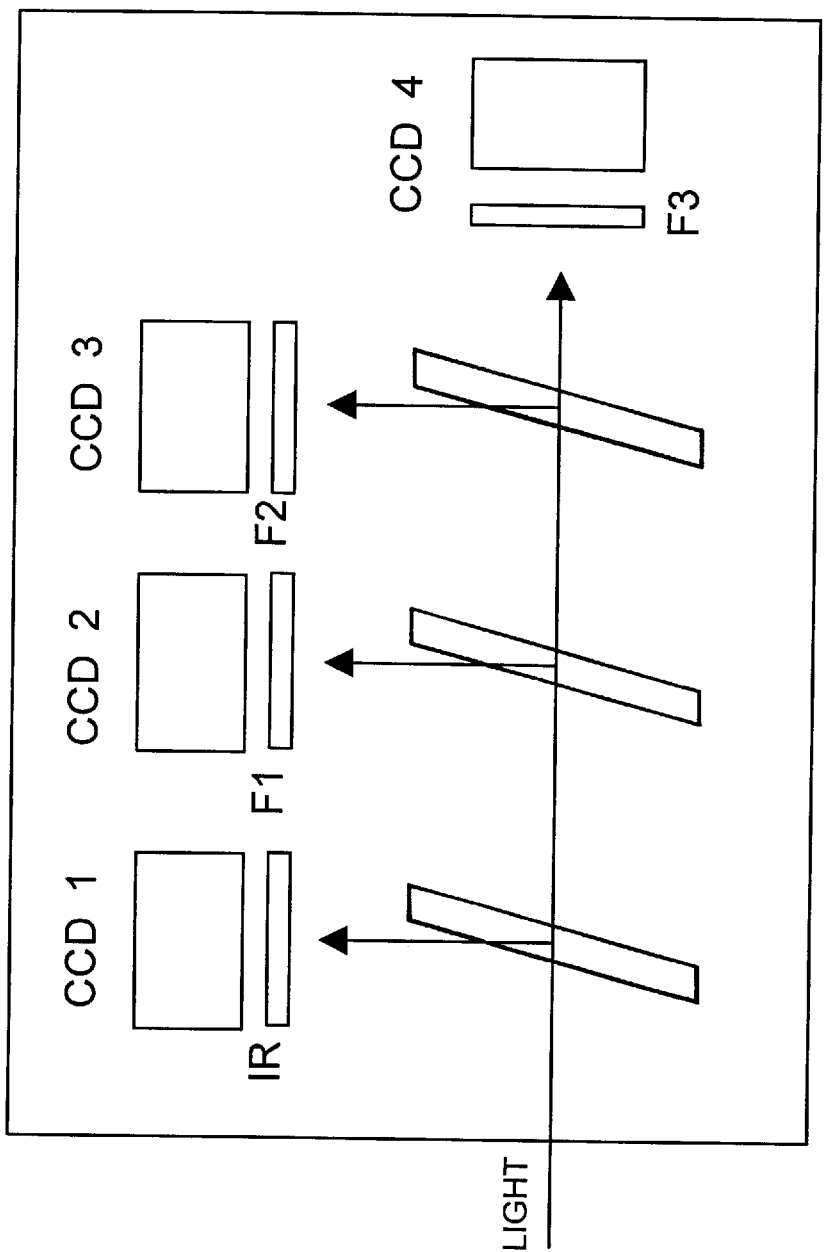
FIG. 6 is a diagrammatic view of a further embodiment of a camera or sensor for the control system of the present invention.

Another embodiment of the camera or sensor 22 of the present invention is illustrated in FIG. 6, in which like reference numerals designate like parts. In this embodiment, the camera or sensor 22 has a beam splitter in order to separate the incoming light reflected from the printed material into an infrared beam for a first CCD 1, $F_1$ such as red for a second CCD 2, $F_2$ such as green for a third CCD 3, and $F_3$ such as blue for a fourth CCD. In this embodiment, suitable prisms, lenses, or mirrors may be utilized to accomplish the beam splitting of light in order to obtain the desired color attributes in the various charge coupled devices to supply the information to the computer 30 for storage and processing in the computer 30, in a manner as previously described. Of course, any other suitable camera or sensing device may be utilized to obtain the desired colors.

Thus, a control system 10 for a printing press 11 is provided which ascertains three distinct attributes, such as colors, in the visible region of electromagnetic waves and an attribute in the infrared region of the electromagnetic spectrum for the printed inks. The control system 10 utilizes these four attributes in a four channel device to indicate and control the ink colors for use in the press 11.

Thus, the colors may be sensed from a sheet taken during a current press run, and from a sheet taken during a reference press run, after which the sensed information is utilized in order to modify ink settings of a press 11 in order to obtain repeatability of the same colors from the reference run to the current press run. In this manner, a consistent quality of colors may be maintained by the printing press 11 irrespective of the number of runs after the reference run has been made, and may be continuously used during a press run if desired.

Figure 12:
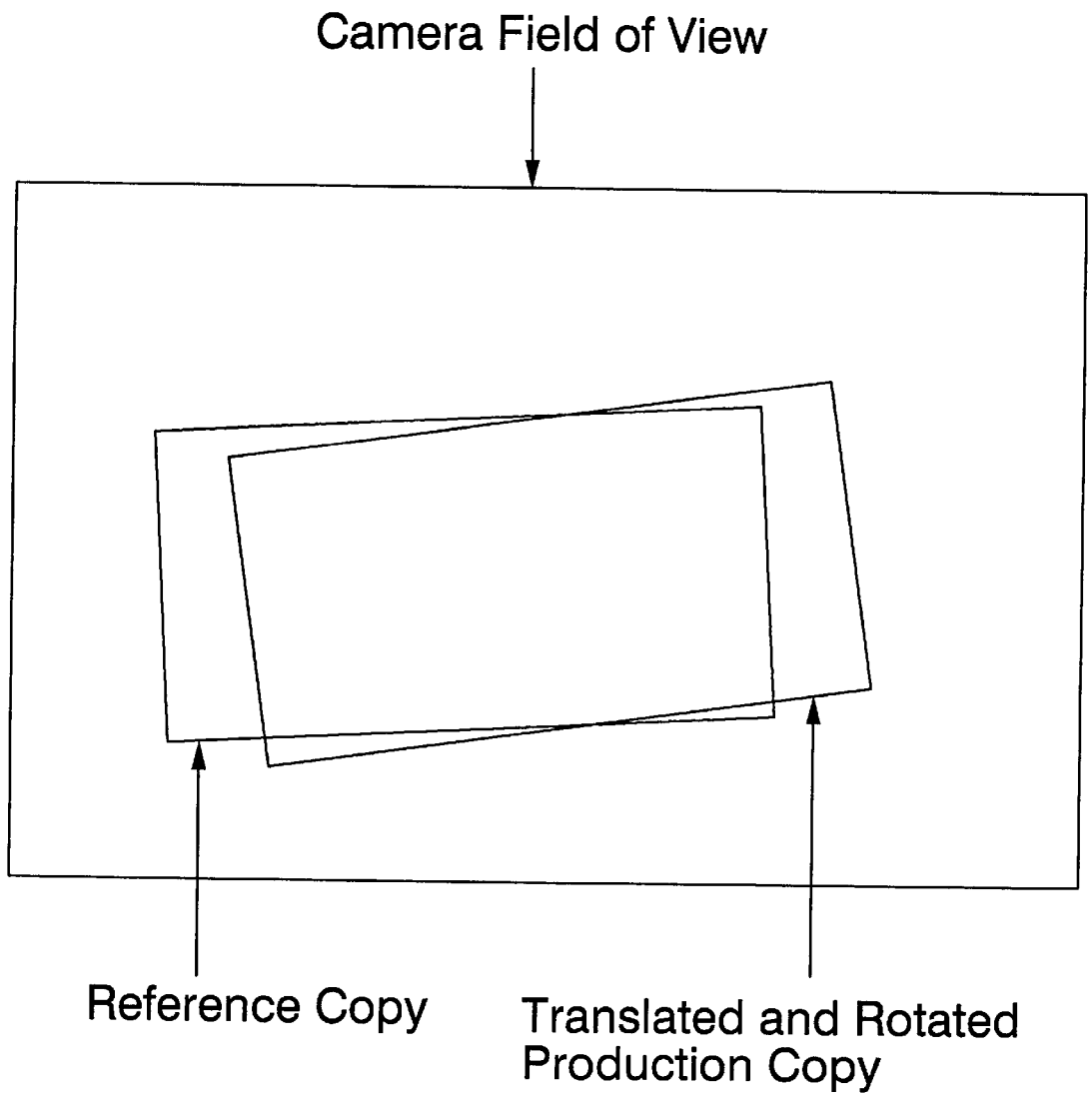
FIG. 12 is a diagrammatic view of a production copy being misaligned with a reference copy.

It has been found when reference or production copies are placed in the field of view of the camera that a production copy might be placed under the camera field of view in a position other than that occupied by the reference copy when its image was acquired, as show in FIG. 12. Since electronic comparisons are made between the images in such small areas, it is nearly impossible to humanly align the production image in the same location as that previously occupied by the reference. The process used to manufacture the printed material also compounds the problem of positioning since the paper may be cut in a different place from copy to copy. The image may be printed in a different location on the moving press web as rolls of paper replenish the process. Each of these conditions makes it more difficult to align copies manually, even with the aid of an alignment guide such as a straight edge fixed to a table. Exact alignment is necessary since comparisons between the two images occur on a pixel by pixel basis which may represent copy displacement on the order of hundredths or thousands of an inch. It is clear that an automatic alignment device is necessary so that the features and color in one image might be compared with the exact same features and color in a second image within reasonable limits.

Figure 13:
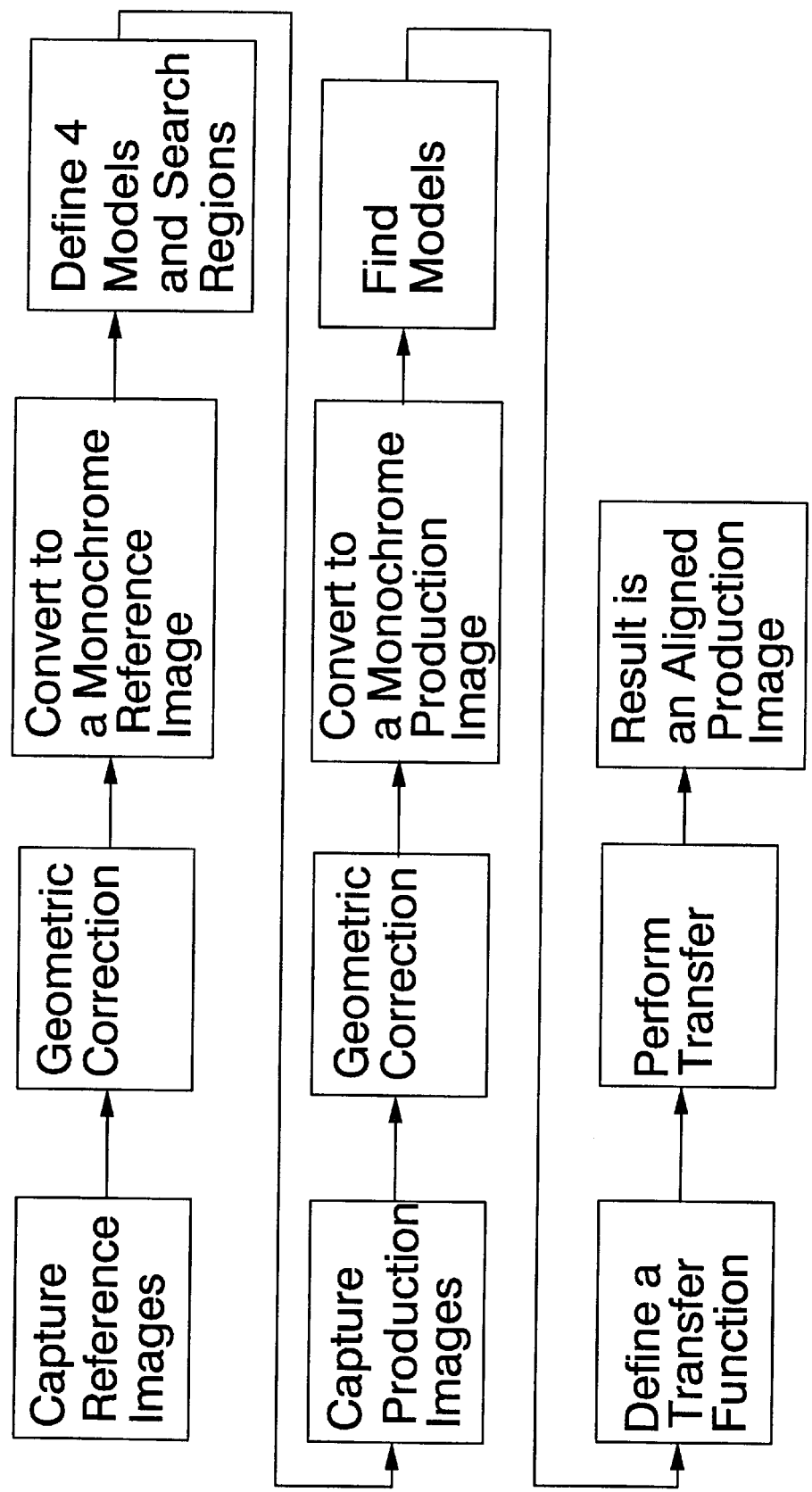
FIG. 13 is a block diagram of the device of the present invention.

The device described herein and shown in FIG. 13 performs the alignment function by declaring an image feature to be an object model, or model. When the same feature is found in the production image, the center of this model can be electronically aligned with the center of the model found in the reference image. While the process is described in detail for up to four models per image, more models can be used. Alignment of the four models in the production image to those in the reference image implies all other features in the image are accordingly aligned.

In accordance with the present invention, a color image is captured from the printed material designated as being the reference. This function is performed with a camera, a digitizing board and a computer. The computer memory then contains numeric values for picture elements contained in the imager (camera). Values are present for red, green and blue pixels (picture elements). A translation is then performed to correct any geometric distortion caused by the lens, if necessary. The red, green and blue values from a pixel are then averaged providing a resultant monochrome image. The three components (red, greed, blue) of a color image are converted to a single black and white image through this averaging process so features may be found in only one image plane rather than three. It also reduces the difficulty in finding a model in an image when the color content of the production image is slightly different from that of the reference image. This could occur if the amount of ink delivered to the paper changes during the printing process.

Figure 14:
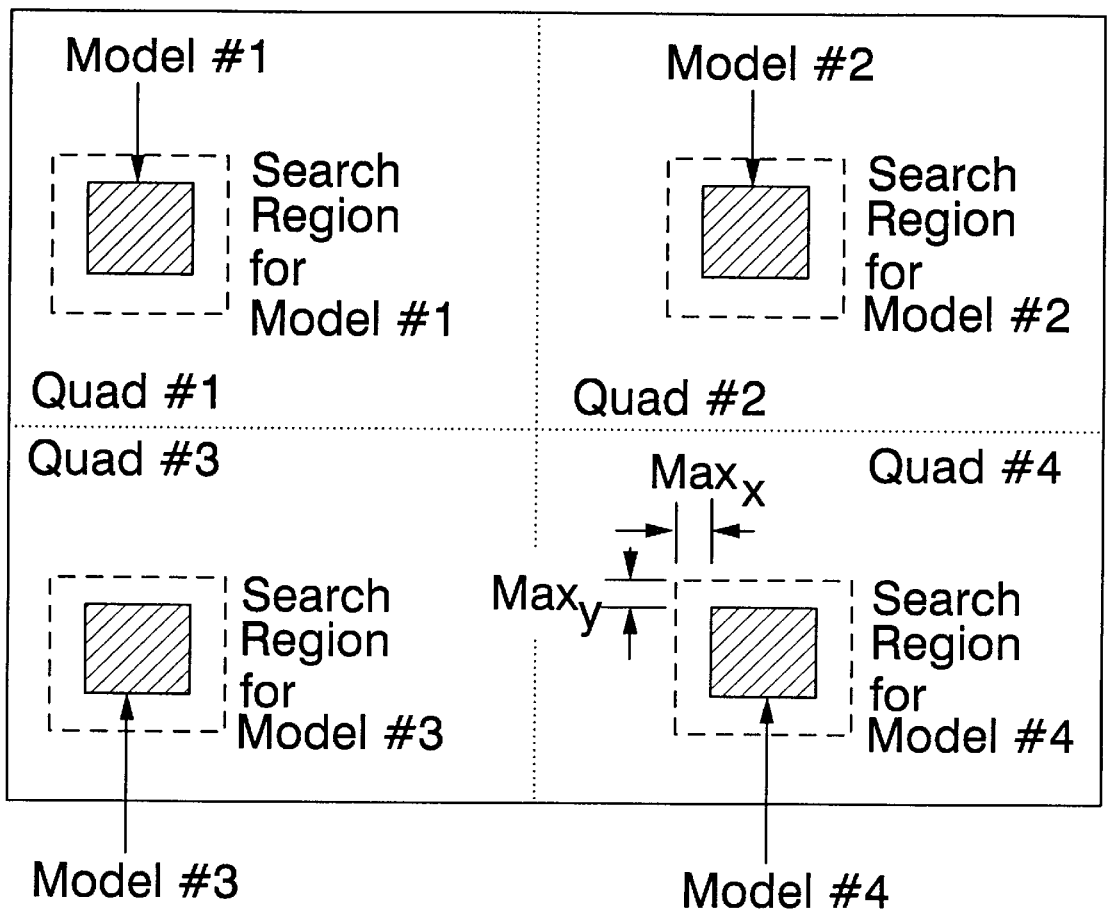
FIG. 14 is a diagrammatic view showing search regions and models.

Once the reference is captured, up to four models are defined within the image, as shown in FIG. 14. This is done by dividing the image into four pieces (quads) and then defining a model in each of the quads. A model will typically be a feature rich area of the image within the quad. Features are denoted as transitions from dark to light in the monochrome image. The model, or number of features to be labeled as the model will occupy a space smaller than the quad in the image. While it is desirable that the model be a unique set of features within the quad, it actually only has to be unique within an arbitrary search region which encompasses the model position and the immediate space around it. The search region is constrained to a sufficiently large group of pixels within the camera so as to have the features of the model within its bound when subsequent copies are placed under the camera with maximum misalignment. At this point, four search regions have been defined to surround each of the model positions in the monochrome reference image as shown in FIG. 14.

Figure 15:
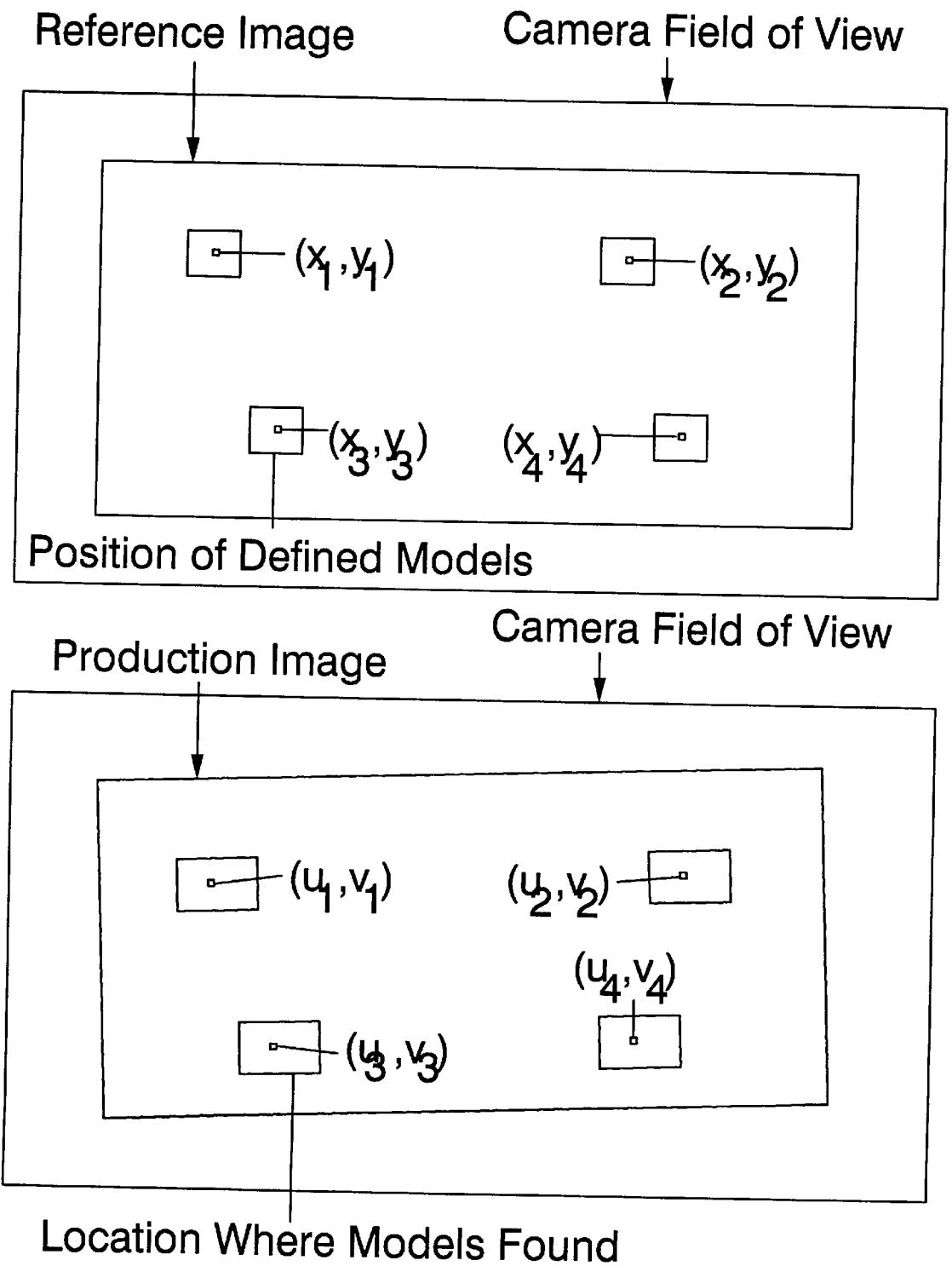
FIG. 15 is a diagrammatic view showing the models in a reference copy and production copy.
Figure 16:
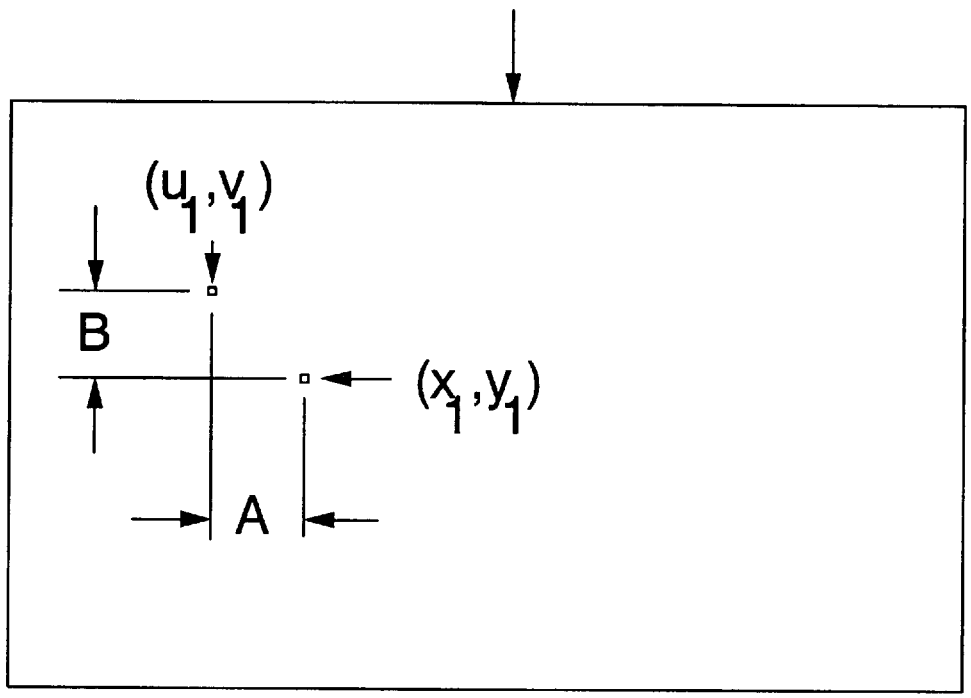
FIGS. 16–19 are diagrammatic views showing different transfer functions when one, two, three, or four models are found, respectively.
Figure 17:
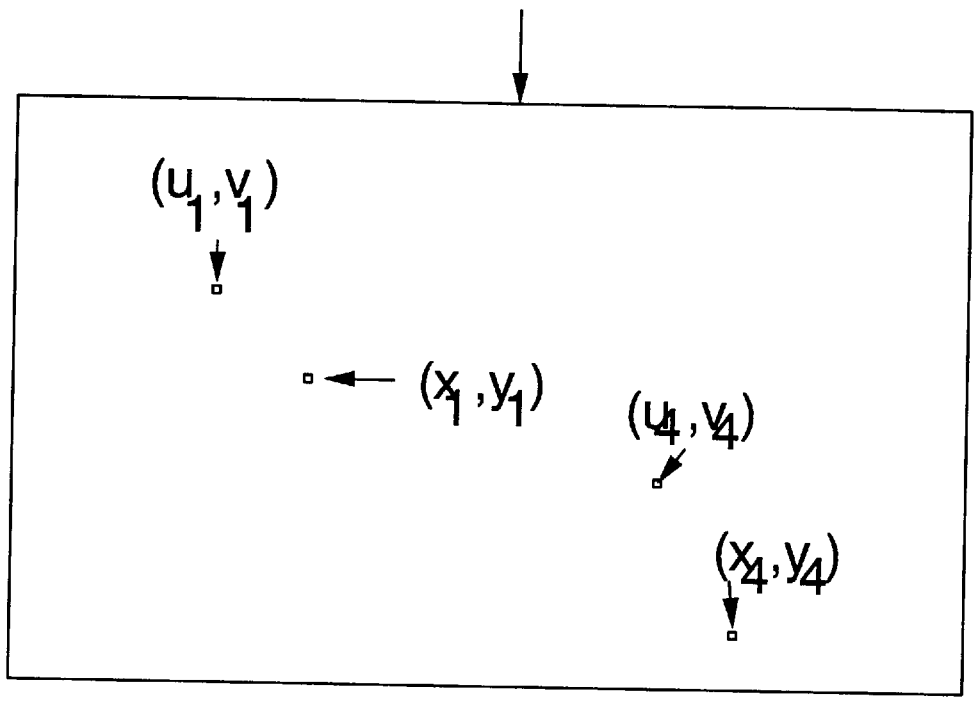
Figure 18:
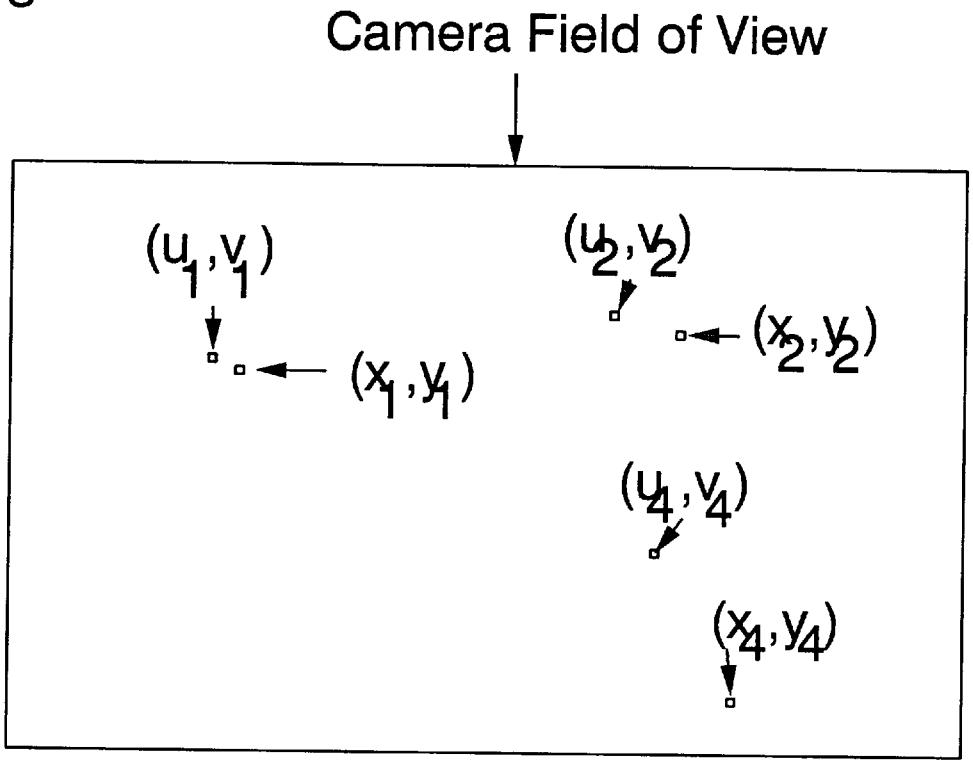
Figure 19:
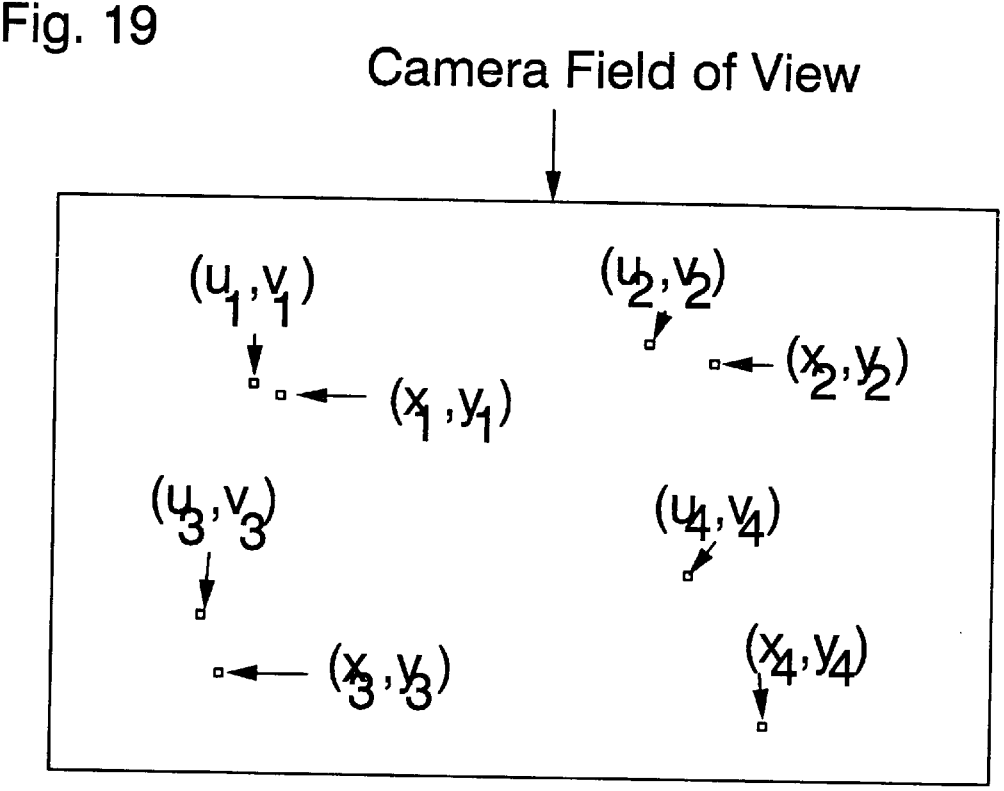

A production copy is then placed in the field of view of the camera, and a color image is captured. The color image is then converted to a monochrome image, as described above. The device then looks for a model within the models search region. Each potential "find" is given a score indicating the likelihood that the model features were actually found. Based on the score, the device then declares a model as found or not found. This process occurs for each of the four models. Models may not be found if printed matter placed under the camera is misaligned more than the maximum amount specified in the search region. Models also may not be found if the copy is severely degraded. FIG. 15 shows defined model positions in the reference image and found model positions in the production image.

If at least one model is found, a transfer function is defined which maps the found model positions to the defined model positions. One such transfer function could be a bi-linear function. The transfer functions for the number of models found are illustrated in FIGS. 16–19. Based on the number of models found, this transfer function, may be either a translation, rotation, scaling, warping function, or any combination of these. This alignment processing is performed for all image planes obtained from the production copy. The resultant images will be aligned with those captured from the reference copy.

When the device is used to align images so that the color may be compared between the reference and production copies, more image planes may be captured than just the three components (red, green and blue) of the color image. For instance, a near infrared image may also be captured. This image would not have to contribute to the creation of the monochrome image but the aligning transform would be applied to this image so that the four image planes of the production image would align over the four image planes of the reference image.

The foregoing detailed description has been given for clearness of understanding only, and no unnecessary limitations should be understood therefrom, as modifications will be obvious to those skilled in the art.

What is claimed is:

1. A device to align a production image with a reference image in a printing press control system, comprising:

means for capturing at least two monocolor image planes of a color reference image from a reference copy;

means for converting the at least two monocolor image planes of the color reference image into a monochrome reference image;

means for capturing at least two monocolor image planes of a color production image from a production copy;

means for converting the at least two monocolor image planes of the color production image into a monochrome production image;

means for defining at least one object model in the monochrome reference image, the defining means noting a position of the at least one object model;

means for identifying a position of the at least one object model in the monochrome production image;

means for defining a positional transfer function which maps the position of the at least one object model in said monochrome production image to the position of the at least one object model in said monochrome reference image; and means for applying the positional transfer function to each of the at least two monocolor image planes of the production image to align the production image with the reference image.

2. The device of claim 1 wherein the capturing means captures an infrared image.

3. The device of claim 1 including means for performing an image warp to correct any geometric distortion caused by a lens.

4. The device of claim 1 including means for limiting a maximum displacement between the production and reference copy images.

5. The device of claim 1 including means for dividing the images into four quads.

6. The device of claim 1 wherein the at least one object model comprises four models, and the defining means defines one model in each quad of the monochrome reference image.

7. The device of claim 1 including means for defining a search region for the at least one model, means for searching for the at least one model within the search region to find the position of the at least one model in the monochrome production image, and means for providing the at least one model with a score indicating the degree of match.

8. The device of claim 1 wherein the converting means averages pixel values for the at least two monocolor image planes.

9. The device of claim 1 including means for defining search regions for the at least one model.

10. The device of claim 1 wherein the positional transfer function performs a translation, rotation, scaling or warping function, or any combination of these functions.

11. The device of claim 1 wherein the defining means notes horizontal and vertical coordinates of a center of the at least one object model.

12. A method for obtaining color consistency in a color printing press comprising the steps of:

providing a reference copy of an image;

measuring red, green, and blue reflection values of pixels in the reference copy;

storing the red, green, and blue reflection values measured from the reference copy as numeric values respectively indicating the red, green, and blue content of the pixels in the reference copy of the image;

averaging the numeric values representative of the red, green, and blue content of each pixel in the reference copy of the image to develop a monochrome reference image thereof;

defining at least one model within the monochrome reference image and noting its position in the monochrome reference image;

providing a production copy of the image as printed by the printing press;

measuring red, green, and blue reflection values of pixels in the production copy;

storing the red, green, and blue reflection values measured from the production copy as numeric values respectively indicating the red, green, and blue content of the pixels in the production copy of the image;

averaging the numeric values representative of the red, green, and blue content of each pixel in the production copy of the image to develop a monochrome production image thereof;

searching the monochrome production image for the at least one model and, upon finding the at least one model, noting its position in the monochrome production image;

defining a positional transfer function mapping the position of the at least one model found in the monochrome production image to the position of the at least one model defined in the monochrome reference image;

employing the positional transfer function to align the production copy with the reference copy; and adjusting the printing press to correct differences between the red, green, and blue reflection values of corresponding pixels in the reference and production copies.

13. A method as defined in claim 12 further comprising the steps of measuring infrared reflection values from the reference copy; and measuring infrared reflection values from the production copy.

14. A method as defined in claim 13 wherein numeric values representative of the infrared reflection values measured from the reference copy are averaged with the numeric values representative of the red, green, and blue content of each pixel in the reference copy to develop the monochrome reference image.

15. A method as defined in claim 14 wherein numeric values representative of the infrared reflection values measured from the production copy are averaged with the numeric values representative of the red, green, and blue content of each pixel in the production copy to develop the monochrome reference image.

16. A method as defined in claim 13 further comprising the step of adjusting the printing press to correct differences between the infrared reflection values of corresponding pixels in the reference and production copies.

17. A method as defined in claim 12 further comprising the step of correcting the stored numeric values representative of the reflection values measured from the reference copy to correct for distortions in a device used to measure the reflection values.

18. A method as defined in claim 12 further comprising the step of correcting the stored numeric values representative of the reflection values measured from the production copy to correct for distortions in a device used to measure the reflection values.

19. A method as defined in claim 12 further comprising the step of dividing the monochrome reference image into at least two sections.

20. A method as defined in claim 19 wherein the at least one model comprises multiple models, and one of the multiple models is located in each of the at least two sections.

21. A method as defined in claim 12 wherein the positional transfer function performs a translation, a rotation, a scaling, a warping, or any combination of these functions.

* * * * *